United States Patent [19]

Mehaffey

[11] 4,442,010
[45] Apr. 10, 1984

[54] POLYALKOXYLATED AMINES AS DEWATERING AIDS FOR FELDSPATHIC MINERALS

[75] Inventor: Joseph L. Mehaffey, Brookfield, Ill.

[73] Assignee: Akzona Incorporated, Asheville, N.C.

[21] Appl. No.: 440,888

[22] Filed: Nov. 12, 1982

[51] Int. Cl.³ .......................... B01D 37/02; C02F 1/56
[52] U.S. Cl. ........................................ 210/729; 209/5; 210/735; 210/778
[58] Field of Search ............ 209/5; 210/725, 727–729, 210/778, 735; 252/60, 194

[56] References Cited

U.S. PATENT DOCUMENTS

| 2,278,107 | 3/1942 | Jayne et al. | 209/166 |
| 2,975,123 | 3/1961 | Head | 210/728 |
| 4,210,531 | 7/1980 | Wang et al. | 210/727 |

FOREIGN PATENT DOCUMENTS

| 1141601 | 12/1962 | Fed. Rep. of Germany | 210/735 |
| 55-88808 | 7/1980 | Japan | 210/735 |
| 420545 | 11/1934 | United Kingdom | 252/357 |

*Primary Examiner*—Peter A. Hruskoci
*Attorney, Agent, or Firm*—Francis W. Young; Robert F. Green; Jack H. Hall

[57] ABSTRACT

A process for the concentration and dewatering of an aqueous suspension of feldspathic minerals, comprising adding to the suspension a filter aid having the general formula:

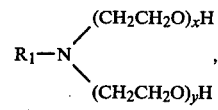

wherein $R_1$ is an alkyl group of between 8 and 18 carbon atoms and wherein x and y are integers greater than 0 whose sum is between 2 and 15.

6 Claims, No Drawings

POLYALKOXYLATED AMINES AS DEWATERING AIDS FOR FELDSPATHIC MINERALS

BACKGROUND OF THE INVENTION

This invention relates to feldspathic mineral dewatering agents and to compositions for producing concentrated feldspathic mineral ores having a lowered moisture content.

There are several known ore concentration processes, including froth flotation and gravity concentration, but each of these processes leaves the ore with a high moisture level. To lower the moisture levels, the ores are generally dehydrated, dewatered, or hydroextracted by filtration. Even these dewatered ores have ranging moistures depending upon the kind of ore, the form of the particles, surface properties of the particles, and the method used for dehydration, dewatering, or hydroextraction. Typically, ores obtained in froth flotation have a moisture content of about 20 to 60% by weight. Reduction of these ore moistures is important in cost reduction at various stages of ore processing, including transportation, unloading, and drying. The wet concentrates obtained after froth flotation may be found to be sticky and difficult to treat in subsequent metallurgical processing such as smelting or sintering. Such wet concentrates may be further characterized by excessive moisture which is conducive to the concentrate's forming pellets or balls at transfer points between conveyors and at the top part of the roaster. Further, these pellets roast very slowly and thereby increase roasting costs.

Methods heretofore used for producing concentrated ores include evaporating the moisture by heating the wet concentrated ores after filtering. This method is disadvantageous in that it requires large amounts of energy and its attendant expense. For ores such as sulfides, evaporation results in poisonous gas generation.

A still further method is air drying of the ores. This method is disadvantageous in that proper drying can only be assured by spreading the ore in thin layers which requires a large drying surface area and is thus inefficient. The very top layer of the pile may easily be overdried render the ore subject to scattering by winds. Chemical methods of dewatering generally comprise adding the chemical to a mineral ore concentrate and then centrifuging or in some other way filtering the treated ore concentrate. Feldspathic minerals include feldspar, silica sand and combinations or variations of feldspar and silica sand such as "sparsand". The only known effective dewatering agent for feldspathic minerals is sodium dioctyl sulfosuccinate. It is desirable that a more efficient and alternate dewatering agent for feldspathic materials be found.

SUMMARY OF THE INVENTION

The invention is a process for the concentration and dewatering of an aqueous suspension of feldspathic minerals comprising adding to the suspension a filter aid having the general formula:

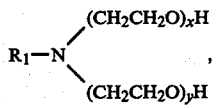

wherein $R_1$ is an alkyl group of between 8 and 18 carbon atoms and wherein x and y are integers greater than 0 whose sum is between 2 and 15. Preferably, the sum of x and y is 5, and $R_1$ is the oleyl group ($C_{18}H_{35}$-). This preferred filter aid corresponds to Armak's Ethomeen® O/15, a pentaethoxylated oleylamine whose common name is polyoxyethylene (5) oleylamine. The filter aid is preferably added at between 0.05 and 0.5 pounds of aid per ton of dry solids contained in the aqueous suspension. Following the addition of the filter aid, the aqueous suspension is filtered.

In an alternate embodiment, the filter aid may be of the formula:

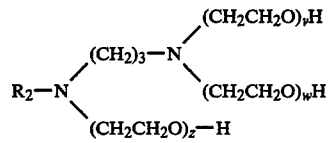

wherein $R_2$ is a $C_8$–$C_{18}$ alkyl group and wherein v, w, and z are integers greater than 0 whose sum is between 3 and 15. Preferably the sum of v, w and z is 10, and $R_2$ is the tallow alkyl group ($C_{18}H_{37}$-). In yet another embodiment of this invention, the filter aid may be of the formula:

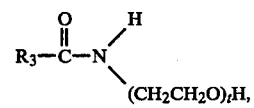

wherein $R_3$ is a $C_8$–$C_{18}$ alkyl group and t is an integer between 1 and 20, inclusive. An object of this invention is a process for the concentration and dewatering of feldspathic mineral ore concentrates so that treated concentrates will have a moisture content lower than untreated concentrates, resulting in savings in energy required for transport or for alternate forms of drying.

DESCRIPTION OF THE PREFERRED EMBODIMENTS

By reducing the surface tension of the liquid component of an aqueous suspension, dewatering agents tend to lower the attraction of the water to the minerals. As a result, the agent lowers the moisture of mineral ores. In this specification, the terms "dewatering agent," "filter aid," and "dewatering aid" shall be used synonymously.

Several chemical surfactants were evaluated as dewatering aids for aqueous slurries of silica sand, or "sparsand", and feldspar samples. The minerals were obtained from mining companies located in the Kings Mountain and Spruce Pine areas of North Carolina. The test apparatus for the fritted-disc funnel bench-scale dewatering test method included a Leeson type-SD vacuum pump controlled by a Gra-Lab timer hooked in series to two 2000-ml Erlenmeyer flasks. The flasks were connected to a separatory funnel holding the fritted-disc filtration funnel. The 60-ml fritted disc funnel contained at its base a coarse fritted disc having a 40 mm diameter and further contained Whatman 540 filter paper. Each test sample comprised 40 grams of mineral to which was added 50 ml of distilled water and the dewatering aid. These constituents were blended in a 250-ml Erlenmeyer flask mixed for 60 seconds, and then poured into the fritted-disc funnel. The vacuum pump was activated by setting the timer, and the pump drew a constant vacuum of 21 inches of mercury against the filter surfce area of 1,257 square millimeters. During the next sixty seconds, the effluent was collected in the separatory funnel. The volume of the effluent and the wet weight of the filtered solids were determined. After drying for 16 hours at 200° F. in a THELCO oven, the sample was again weighed. The percent residual water was calculated using the equation below:

$$\% \text{ H}_2\text{O} = \left[ \frac{\text{wet weight} - \text{dry weight}}{\text{wet weight}} \right] \times 100.$$

Before dewatering tests were run, a standard moisture level for each of the mineral samples was established by running "blank" tests on samples containing only water and feldspathic mineral. The blank tests established a standard moisture level against which to compare the results obtained with dewatering aids, and also served as indicators of mechanical or other breakdowns. By performing an occasional "blank" test during the dewatering tests, one could determine, for example, if the fritted disc was clogged.

Four mineral samples from North Carolina were initially evaluated. Sample A was silica sand, Samples B and C were feldspar, and Sample D was sparsand. In this test, a sparsand sample having the following mineral composition was dewatered. Sparsand is a variation of silica sand:

TABLE I

| Mineral Composition, Sparsand | |
|---|---|
| MINERAL | Percent |
| Total $SiO_2$ | 75.66 |
| Free $SiO_2$ | 65.08 |
| $Al_2O_3$ | 10.58 |
| $Na_2O_3$ | 4.43 |
| $K_2O$ | 2.40 |
| $Fe_2O_3$ | 1.21 |
| CaO | 0.24 |
| MgO | 0.04 |

EXAMPLE 1

Forty (40) grams of the mineral composition set forth in Table I was added to 50 ml of distilled water and 4 milligrams of Ethomeen ® T/15 or 8 milligrams of Ethomeen ® T/15, so as to correspond to a dosage of 0.2 pounds per ton and 0.4 pounds per ton, respectively, of dry ore or dry solids. Ethomeen ® T/15 is a product of the Armak Company, Industrial Chemicals Division, 300 South Wacker Drive, Chicago, Ill., and is Armak's trademark for polyoxyethylene (5) tallowamine. The blend is then treated as described in the above procedure.

Nalco ® 8818, a known commercial feldspathic mineral dewatering agent, was used as the dewatering agent in an otherwise identical test. Nalco ® 8818, a product of the Nalco Chemical Company, Oakbrook, Ill. 60521, is commonly known as sodium dioctyl sulfosuccinate, and the comparative results are as follows:

The column headed "CPV" corresponds to "Cost Performance Value". CPV is obtained by multiplying the cost per pound of the dewatering agent used by the pounds of dewatering agent used per ton of dry mineral. Accordingly, CPV corresponds to cost in dollars of that agent per ton of dry mineral at that particular dosage of dewatering agent. It provides a basis for determining the cost effectiveness of an agent. The column headed "% $H_2O$" corresponds to the moisture remaining in the sparsand sample after the dewatering treatment as described above. The lower this figure, the more desirable the dewatering agent. However, "% $H_2O$" is not a figure that may be directly correlated to an agent's cost effectiveness.

TABLE II

| Ethomeen ® T/15 vs. Nalco ® 8818 | | | |
|---|---|---|---|
| CHEMICAL | DOSAGE, lbs./ton | CPV, $/ton | % $H_2O$ |
| Ethomeen ® T/15 | 0.2 | 0.220 | 2.3 |
| | 0.4 | 0.440 | 2.2 |
| Nalco ® 8818[1] | 0.2 | 0.262 | 3.0 |
| | 0.4 | 0.524 | 3.7 |

[1]60% active product

EXAMPLE 2

This example was the same as that set forth in Example 1, except that instead of Ethomeen ® T/15, Ethoduomeen ® T/20 was used. Ethoduomeen ® T/20 is also a product of the Armak Company, and is Armak's trademark for N,N',N'-polyoxyethylene(10)-N-tallow-1,3-diaminopropane. The results are as follows:

TABLE III

| Ethoduomeen ® T/20 vs. Nalco ® 8818 | | | |
|---|---|---|---|
| CHEMICAL | DOSAGE, lbs./ton | CPV, $/ton | % $H_2O$ |
| Ethoduomeen ® T/20 | 0.2 | 0.236 | 2.8 |
| | 0.4 | 0.472 | 2.3 |
| Nalco ® 8818 | 0.2 | 0.262 | 3.0 |
| | 0.4 | 0.524 | 3.7 |

EXAMPLE 3

This example was the same as that set forth in Example 1, except that instead of Ethomeen ® T/15, Ethomid ® O/15 was used. Ethomid ® O/15 is a product of the Armak Company, and is Armak's trademark for polyoxyethylene(5)oleamide. Such compounds are of the general formula:

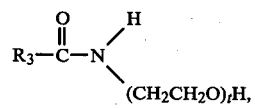

wherein $R_3$ may be a $C_8$–$C_{18}$ alkyl group and t is an integer between 1 and 20, inclusive. For Ethomid ® O/15, t is 5 and $R_3$ is $C_{18}H_{35}$. The results are as follows:

TABLE IV

| Ethomid ® O/15 vs. Nalco ® 8818 | | | |
|---|---|---|---|
| CHEMICAL | DOSAGE, lbs./ton | CPV, $/ton | % $H_2O$ |
| Ethomid ® O/15 | 0.2 | 0.284 | 2.6 |
| | 0.4 | 0.568 | 2.7 |
| Nalco ® 8818 | 0.2 | 0.262 | 3.0 |
| | 0.4 | 0.524 | 3.7 |

What is claimed is:

1. A process for the concentration and dewatering of an aqueous suspension of feldspathic minerals, comprising: adding to said suspension a filter aid in an amount between 0.05 and 0.5 pounds per ton of dry solids contained in said aqueous suspension, said filter aid having the general formula:

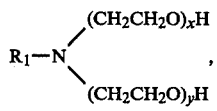

wherein $R_1$ is an alkyl group of between 8 and 18 carbon atoms and wherein x and y are integers greater than 0 whose sum is between 2 and 15; and then filtering said aqueous suspension.

2. The process as set forth in claim 1, wherein the sum of x and y is 5 and wherein $R_1$ is the oleyl group ($C_{18}H_{35}$-).

3. A process for the concentration and dewatering of an aqueous suspension of feldspathic minerals, comprising adding to said suspension 0.05 to 0.5 pounds per ton of dry solids contained in said aqueous suspension a filter aid of the formula:

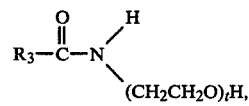

wherein $R_2$ is a $C_8$–$C_{18}$ alkyl group and wherein v, w, and z are integers greater than 0 whose sum is between 3 and 15; and then filtering said aqueous suspension.

4. The process as set forth in claim 3, wherein the sum of v, w, and z is 10 and $R_3$ is the tallowalkyl group ($C_{18}H_{37}$-).

5. A process for the concentration and dewatering of an aqueous suspension of feldspathic minerals, comprising adding to said suspension a filter aid in an amount between 0.05 and 0.5 pounds per ton of dry solids contained in said aqueous suspension, said filter aid having the general formula:

$$R_3-\overset{O}{\underset{\|}{C}}-N\diagdown\diagup^H_{(CH_2CH_2O)_tH,}$$

wherein $R_3$ is a $C_8$–$C_{18}$ alkyl group and t is an integer between 1 and 20, inclusive, and then filtering said aqueous suspension.

6. The process as set forth in claim 5, wherein $R_3$ is $C_{18}H_{35}$ and wherein t is 5.

* * * * *